(12) United States Patent
Isdal et al.

(10) Patent No.: US 10,997,032 B2
(45) Date of Patent: May 4, 2021

(54) VIRTUAL MACHINE

(71) Applicant: Google LLC, Mountain View, CA (US)

(72) Inventors: Tomas Isdal, Seattle, WA (US); Ming Zhao, Bellevue, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/703,452

(22) Filed: Dec. 4, 2019

(65) Prior Publication Data

US 2020/0110624 A1    Apr. 9, 2020

Related U.S. Application Data

(63) Continuation of application No. 15/350,017, filed on Nov. 12, 2016, now Pat. No. 10,540,192, which is a continuation of application No. 14/645,534, filed on Mar. 12, 2015, now Pat. No. 9,524,214.

(60) Provisional application No. 61/969,369, filed on Mar. 24, 2014.

(51) Int. Cl.
| | |
|---|---|
| *G06F 11/07* | (2006.01) |
| *G06F 11/14* | (2006.01) |
| *G06F 8/61* | (2018.01) |
| *G06F 9/455* | (2018.01) |
| *G06F 9/54* | (2006.01) |

(52) U.S. Cl.
CPC ............ *G06F 11/1438* (2013.01); *G06F 8/63* (2013.01); *G06F 9/45504* (2013.01); *G06F 9/541* (2013.01); *G06F 11/0712* (2013.01); *G06F 11/0748* (2013.01); *G06F 11/0757* (2013.01); *G06F 11/1484* (2013.01)

(58) Field of Classification Search
CPC ............ G06F 11/1484; G06F 11/0712; G06F 11/0748; G06F 11/0757; G06F 9/541; G06F 9/5011
See application file for complete search history.

(56) References Cited

U.S. PATENT DOCUMENTS

| | | |
|---|---|---|
| 8,185,776 B1 | 5/2012 | Gentes et al. |
| 2003/0061265 A1 | 3/2003 | Maso et al. |
| 2006/0143622 A1* | 6/2006 | Prabandham ........... G06F 9/445 719/328 |
| 2007/0006325 A1* | 1/2007 | Gargaro .............. H04L 63/0281 726/27 |
| 2011/0202795 A1 | 8/2011 | Marathe et al. |
| 2012/0030670 A1 | 2/2012 | Vijay et al. |
| 2012/0278801 A1 | 11/2012 | Nelson et al. |
| 2013/0151706 A1* | 6/2013 | Henriquez .............. G06F 9/452 709/226 |

(Continued)

*Primary Examiner* — Yolanda L Wilson
(74) *Attorney, Agent, or Firm* — Honigman LLP; Brett A. Krueger

(57) ABSTRACT

A method includes executing a virtual machine, which executes on a data processing device and includes an application container and an agent. The application container includes a file system mount interfaced with a file system residing outside the application container, an application programming interface (API), and a software application including a reference to the API. The agent is configured to monitor whether the software application attempts to access any resources outside of the application container. When the software application attempts to access any resources outside of the application container, the agent is configured to execute a remediation routine.

21 Claims, 7 Drawing Sheets

(56) References Cited

U.S. PATENT DOCUMENTS

2013/0227335 A1    8/2013   Dake et al.
2015/0067147 A1    3/2015   Carmel et al.

* cited by examiner

VIRTUAL MACHINE

CROSS REFERENCE TO RELATED APPLICATIONS

This U.S. patent application is a continuation of, and claims priority under 35 U.S.C. § 120 from, U.S. patent application Ser. No. 15/350,017, filed on Nov. 12, 2016, which is a continuation of U.S. patent application Ser. No. 14/645,534, filed on Mar. 12, 2015, which claims priority under 35 U.S.C. § 119(e) to U.S. Provisional Application 61/969,369, filed on Mar. 24, 2014. The disclosures of these prior applications are considered part of the disclosure of this application and are hereby incorporated by reference in their entireties.

TECHNICAL FIELD

This disclosure relates to virtual machines executable on a data processing device.

BACKGROUND

In a distributed system, a data processing device can execute instructions configuring the data processing device to instantiate an instance of a virtual machine. A virtual machine can emulate a computer and an operating system running on the computer. A virtual machine can be used to execute a software application.

SUMMARY

One aspect of the disclosure provides a distributed system for a virtual machine. The distributed system includes one or more data processing devices executing instructions configuring the one or more data processing devices to execute a virtual machine and an application server. The virtual machine includes a software application and an agent. The agent is configured to receive a first health status of the software application, determine a second health status of the software application, compare the first health status and the second health status and restart the software application based on the comparison. The application server is configured to remotely determine the first health status of the software application and send the first health status of the software application to the virtual machine.

Implementations of the disclosure may include one or more of the following optional features. In some implementations, the agent is configured to restart the software application in response to the first health status being different from the second health status. The agent may further be configured to receive the first health status periodically and to restart the software application in response to not receiving the first health status within a threshold period of time.

In some examples, the application server is further configured to receive a health check configuration and determine the first health status of the software application based on the health check configuration. The agent may be configured to receive a health check configuration and determine the second health status based on the health check configuration. The health check configuration may be provided by a user.

The virtual machine may further include a health check handler interfaced with the software application and the application server may determine the first health status via the health check handler. The second health status may include a previous health status determined by the application server. The agent may be configured to restart the virtual machine based on the comparison. The agent may further be configured to restart the virtual machine in response to a subsequent mismatch between the first health status and the second health status after the application is restarted.

Another aspect of the disclosure provides a computer-implemented method for an operating a virtual machine. This aspect may include one or more of the following optional features. The computer-implemented method includes executing a software application in a virtual machine executing on a data processing device and receiving, at the virtual machine, a first health status of the software application from an application server executing on a data processing device. The method further includes determining, at the virtual machine, a second health status of the software application, comparing the first health status and the second health status and restarting the software application based on the comparison.

In some implementations, restarting the virtual machine includes restarting in response to the first health status being different from the second health status. Receiving a first health status of the software application may include receiving the first health status periodically. Restarting the virtual machine may further include restarting the software application in response to not receiving the first health status within a threshold period of time.

In some examples, the method further includes receiving a health check configuration, wherein the first health status and the second health status of the software are determined based on the health check configuration. The health check configuration may be provided by a user.

The method may include determining the first health status of the software application via a health check handler interfaced with the software application. The second health status may include a previous health status determined by the application server. The method may include restarting the virtual machine based on the comparison. The method may further include restarting the virtual machine in response to a subsequent mismatch between the first health status and the second health status after the software application is restarted.

Yet another aspect of the disclosure provides a virtual machine executable on a data processing device. This aspect may include one or more of the following optional features. The virtual machine includes a software application and an agent. The agent is configured to receive a first health status of the software application executing in a virtual machine, determine a second health status of the software application, compare the first health status and the second health status and restart the software application based on the comparison.

In some examples, the agent is configured to restart the software application in response to the first health status being different from the second health status and to receive the first health status periodically. The agent may be configured to restart the software application when the agent does not receive the first health status during a predetermined time duration. The agent may further be configured to receive a health check configuration and determine the second health status based on the health check configuration.

The virtual machine may include a health check handler interfaced with the software application, wherein the agent is configured to receive the first health status and determine the second health status via the health check handler. The second health status may be based on a first health status determined at a previous time. The agent may be configured to restart the virtual machine based on the comparison or to restart the virtual machine in response to a subsequent mismatch between the first health status and the second health status after the software application is restarted.

Yet another aspect of the disclosure provides a distributed system for deploying a software application. The distributed system includes one or more data processing devices and a non-transitory computer readable medium. The data processing devices execute instructions configuring the one or more data processing devices to execute a virtual machine and an application server. The virtual machine includes an image of an operating system and a software application. The non-transitory computer readable medium is in communication with the one or more data processing devices. The non-transitory computer readable medium stores an image repository that stores one or more images. The application server is configured to receive a selection of a policy from a plurality of policies and associate the selected policy with the software application. In response to the selected policy being a first policy, when the software application is first deployed, the application server is configured to archive the image mounted on the virtual machine in the image repository and associate the mounted image with the software application. In response to receiving a command to redeploy the software application, if the policy associated with the software application is the first policy, the application server is configured to retrieve the image associated with the software application from the image repository. If the policy associated with the software application is a second policy, the application server is configured to retrieve the most recent image in the image repository, mount the retrieved image on the virtual machine and redeploy the software application.

The computer readable medium may further store a security repository storing a security patch. The application sever may be further configured to, in response to receiving the command to redeploy the software application, install the security patch on the virtual machine, if the policy associated with the software application is the second policy, and not install the security patch on the virtual machine, if the policy associated with the software application is the first policy. The application server may be further configured to, in response to the selected policy being a third policy, and when the software application is first deployed, archive the image mounted on the virtual machine in the image repository and associate the mounted image with the software application. In response to receiving the command to redeploy the software application, the application server is configured to retrieve the image associated with the software application from the image repository and install the security patch on the virtual machine.

In some examples, the non-transitory computer readable medium stores a software package repository and the virtual machine includes a software package. The application server may be further configured to, in response to the selected policy being a first policy, when the software application is first deployed, archive the software package installed on the virtual machine in the non-transitory software package repository and associate the installed software package with the software application. In response to receiving a command to redeploy the software application, if the policy is associated with the software application is the first policy, the application server is configured to retrieve the software package associated with the software application from the non-transitory software package repository. If the policy associated with the software application is a second policy, the application server is configured to retrieve the most recent software package stored in the non-transitory software package repository and install the retrieved software package on the virtual machine.

Yet another aspect of the disclosure provides a method for deploying a software application. The method includes, at an application server, receiving a selection of a policy from a plurality of policies and associating the selected policy with the software application. In response to the selected policy being a first policy, when the software application is first deployed, the method includes archiving the image mounted on the virtual machine in a non-transitory image repository and associating the mounted image with the software application. In response to receiving a command to redeploy the software application, if the policy associated with the software application is the first policy, the method includes retrieving the image associated with the software application from the non-transitory image repository. If the policy associated with the software application is a second policy, the method includes retrieving the most recent image stored in the non-transitory image repository, mounting the retrieved image on a virtual machine and redeploying the software application.

In some examples, the method includes, in response to retrieving the command to redeploy the software application, installing a security patch on the virtual machine, if the policy associated with the software application is the second policy, and not installing the security patch on the virtual machine, if the policy associated with the software application is the first policy. The method may further include, in response to the selected policy being a third policy, and when the software application is first deployed, archiving the image mounted on the virtual machine in the non-transitory image and associating the mounted image with the software application. In response to receiving the command to redeploy the software application, the method includes retrieving the image associated with the software application from the non-transitory image repository and installing the security patch on the virtual machine.

The method may further include, in response to the selected policy being a first policy, and when the software application is first deployed, archiving the software package installed on the virtual machine in the non-transitory software package repository and associating the installed software package with the software application. In response to receiving a command to redeploy the software application, if the policy associated with the software application is the first policy, the method includes retrieving the software package associated with the software application from the non-transitory software package repository. If the policy associated with the software application is a second policy, the method includes retrieving the most recent software package stored in the non-transitory software package repository and installing the retrieved software package on the virtual machine.

Yet another aspect of the disclosure provides a distributed system for deploying a software application. The distributed system includes one or more data processing devices, a non-transitory computer readable medium and an application server. The one or more data processing devices execute instructions configuring the one or more data processing devices to execute a virtual machine including an image of an operating system mountable on the virtual machine, a software package executable on the virtual machine and a software application executable on the virtual machine. The non-transitory computer readable medium stores an image repository, a software package repository and a security repository. The application server is in electronic communication with the computer readable medium and is configured to receive a command to redeploy the software application. In response to one of a first policy and a second policy being associated with the software application, the application server mounts a previously mounted image on the virtual machine and installs a previously installed software package on the virtual machine. In response to the second policy being associated with the software application, the application server installs a security patch from the security repository. In response to the third policy being associated with the software application, the application server mounts a new image on the virtual machine, installs a new software package on the virtual machine, installs the security patch from the security repository and redeploys the software application.

Another aspect of the disclosure provides a computer-implemented method for deploying a software application on a virtual machine executing on a data processing device. The method includes receiving a command to redeploy the software application. In response to one of a first policy and a second policy being associated with the software application, the method includes mounting a previously mounted image on the virtual machine and installing a previously installed software package on the virtual machine. In response to the second policy being associated with the software application, the method includes installing a security patch from the non-transitory security repository. In response to the third policy being associated with the software application, the method includes mounting a new image on the virtual machine, installing a new software package on the virtual machine, and installing the security patch from the non-transitory security repository and redeploying the software application.

Another aspect of the disclosure provides a virtual machine executable on a data processing device. The virtual machine includes an image of an operating system executable on the virtual machine. The operating system includes a file system and a plurality of application programming interface libraries. The application container includes a file system mount interfaced with the file system residing outside the application container, a software application including a reference to an application programming interface and the application programming interface referenced by the software application. The application container does not include application programming references that are not referenced by the software application.

In some examples, the file system includes an application specific logging folder and the file system mount in the application container is interfaced with the application specific logging folder. The software application may include a reference to a portion of the operating system, the application container may include only the portion of the operating system referenced by the software application and the unreferenced portion of the operation system may be outside the application container. The application container may be configured to prevent the software application from accessing a resource located outside the application container. The application container may be further configured to generate a warning in response to the software application attempting to access a resource outside the application container.

In some implementations, the virtual machine includes an agent configured to terminate the software application in response to the software application attempting to access a resource outside the application container. The agent may further be configured to terminate the virtual machine in response to the software application attempting to access a resource outside the application container.

Yet another aspect of the disclosure provides a computer-implemented method for executing a software application in a virtual machine executing on a data processing device. The method includes receiving software code for a software application, determining application programming interfaces referenced by the software code, determining portions of an operating system accessed by the software code and creating an application container in the virtual machine. The method also includes application programming interfaces referenced by the software code inside the application container, portions of the operating system accessed by the software code inside the application container and executing the software application inside the application container on the virtual machine.

In some examples, the method includes halting execution of the software application in response to the software application attempting to access an application programming interface outside the application container. The method may further include halting the virtual machine in response to the software application accessing an unauthorized application programming interface outside the application container.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
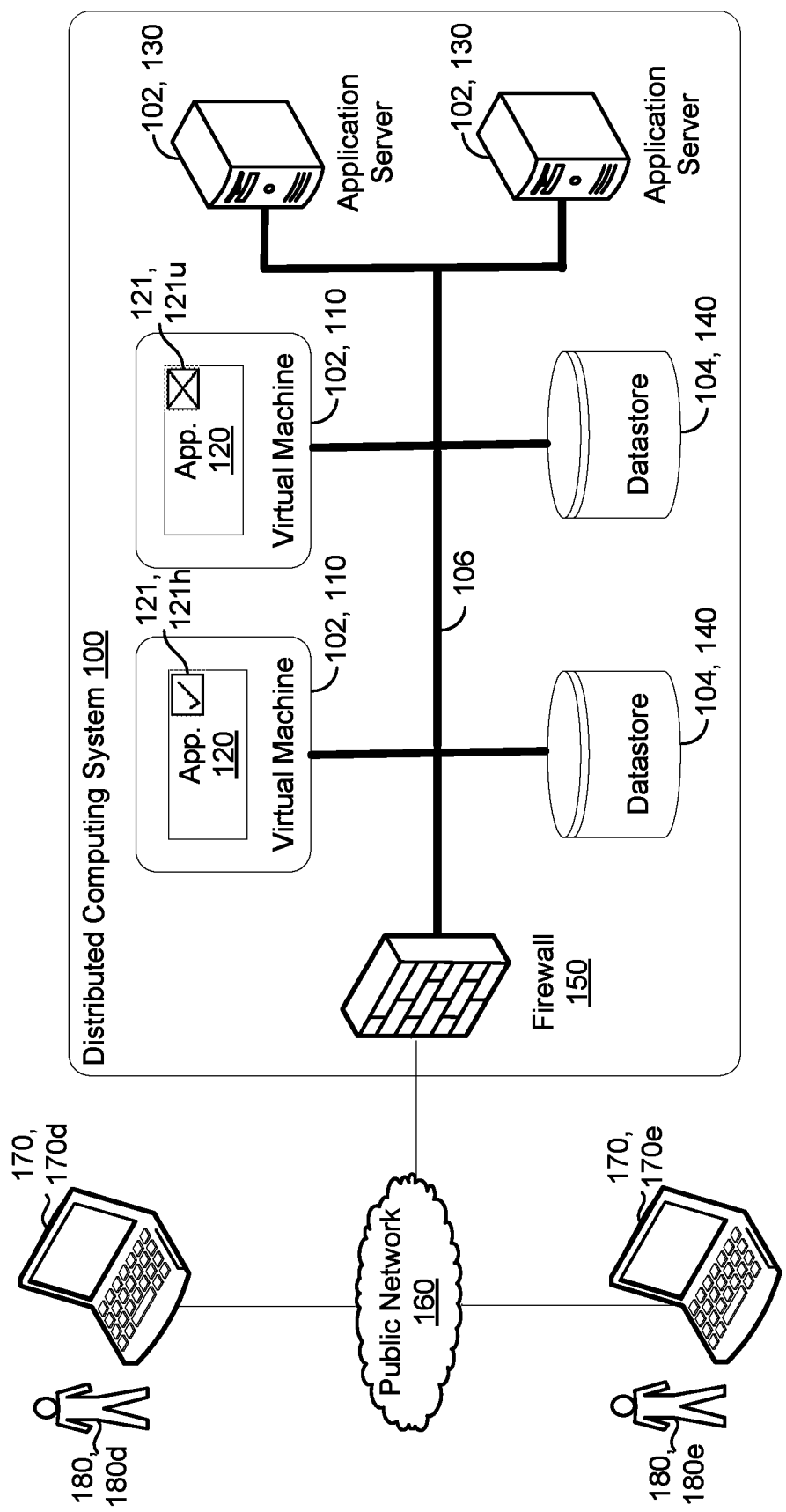
FIG. 1 is a schematic view of an example distributed computing system.

FIG. 1 depicts a distributed computing system 100. The distributed computing system 100 includes one or more data processing devices 102, one or more non-transitory storage mediums 104 and a network 106 connecting the data processing devices 102 and the non-transitory storage mediums 104. A data processing device 102 can execute instructions that configure the data processing device 102 to execute one or more virtual machines 110. The virtual machines 110 can execute one or more software applications 120. A data processing device 102 can execute instructions that configure the data processing device 102 to execute one or more application servers 130. The non-transitory storage mediums 104 can include one or more datastores 140.

In some implementations, the distributed computing system 100 connects to a public network 160, for example the Internet. Moreover, the network 106 may include a firewall 150 to prevent unauthorized access to the distributed computing system 100. Users 180 can access the distributed computing system 100 through user computers 170. A software developer 180d of the software applications 120 may access the distributed computing system 100 through a developer computer 170d. Finally, an end-user 180e can access the software applications 120 through an end-user computer 170e.

The virtual machine 110 is a software-based emulation of a computer. The virtual machine 110 operates based on the computer architecture and functions of a real or hypothetical computer. The software application 120 executed by the virtual machine 110 may have a health status 121, which may include a healthy status 121H or an unhealthy status 121U. In some implementations, the virtual machine 110 and/or the application server 130 determines the health status 121 of the software application 120. Moreover, the user 180 may specify the manner in which the virtual machine 110 and/or the application server 130 determine the health status 121 of the software application 120.

In some implementations, the application server 130 manages the software application 120. In some scenarios, several virtual machines 110 execute a single software application 120. The application server 130 may manage the network traffic being sent to each virtual machine 110 executing the software application 120. For example, if the application server 130 determines that a particular virtual machine 110 executing the software application 120 is slow, then the application server 130 can send network traffic to another virtual machine 110. The software application 120 can use a datastore 140 as operating memory or to store data generated by the software application 120.

Figure 2:
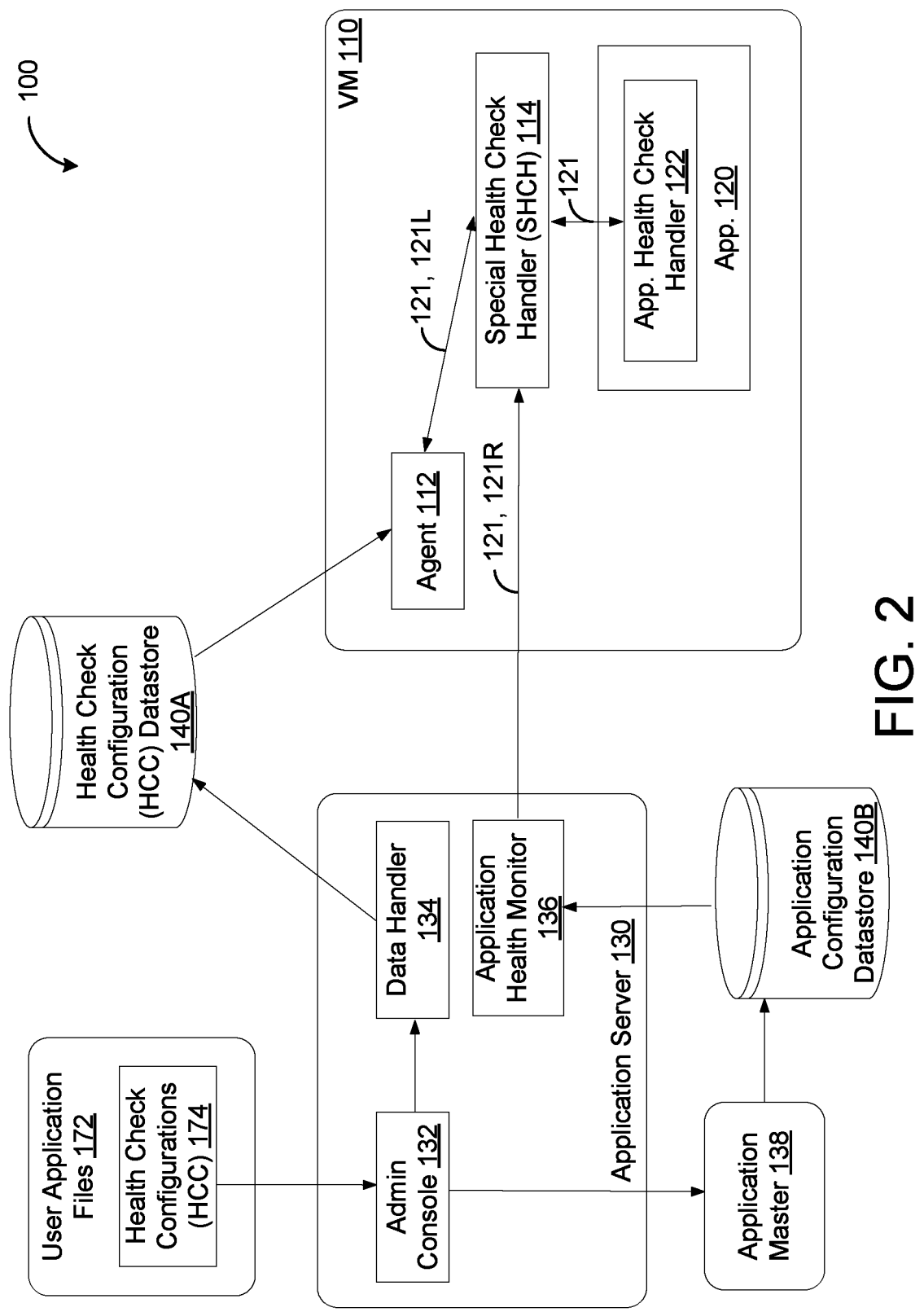
FIG. 2 is block diagram of an example implementation of the distributed computing system shown in FIG. 1.

FIG. 2 depicts an example implementation of the distributed computing system 100. In some implementations, the virtual machine 110 includes an agent 112, which controls the operation of the virtual machine 110. In some implementations, the agent 112 can shut down the virtual machine 110 and/or restart the virtual machine 110. In this example, the virtual machine 110 includes a special health check handler 114 that checks the health status 121 of the software application 120. In some implementations, the agent 112 is configured to check the health status 121 of the software application 120 via the special health check handler 114. The software application 120 may further include an application health check handler 122. The special health check handler 114 may interact with the application health check handler 122 to determine the health status 121 of the software application 120.

The health check handlers 114, 122 may determine the health status 121 of the software application 120 in any suitable manner. In some implementations, the health check handlers 114, 122 determine the health status 121 of the software application 120 by assessing the responsiveness of the software application 120. The health check handlers 114, 122 may determine the responsiveness of the software application 120 by measuring an amount of time the software application 120 takes to complete a particular task. For example, the health check handlers 114, 122 may request the software application 120 to provide information regarding an amount of memory the software application 120 is currently using. If the software application 120 provides the requested information within a predetermined amount of time (e.g., 5 ms), then the health check handlers 114, 122 may determine that the health status 121 of the software application 120 is healthy 121H. On the other hand, if the software application 120 does not respond to the request or takes too long to respond to the request (e.g. more than 10 s), then the health check handlers 114, 122 may determine that the software application 120 is unhealthy 121U.

In some implementations, the health check handlers 114, 122 determine the health status 121 of the software application 120 by determining a number of memory leaks in the software application 120. The virtual machine 110 may have allocated a block of memory for the software application 120 to use. If the software application 120 uses a memory block that is not within the allocated block, then the health check handlers 114, 122 may determine that the software application 120 is unhealthy 121U.

In other implementations, the health check handlers 114, 122 may determine the health status 121 of the software application 120 by determining whether the software application 120 is attempting to access an unauthorized or restricted application programming interface (API). The virtual machine 110 may restrict access to certain APIs to prevent a corrupt or malicious software application 120 from causing damage to the virtual machine 110. If the software application 120 is attempting to access a restricted API, then the health check handlers 114, 122 may determine that the software application 120 is unhealthy 121U.

In yet other implementations, the health check handlers 114, 122 may determine the health status 121 of the software application 120 based on user feedback. An end user 180e may rate the software application 120. For example, the end user 180e may provide a rating that ranges from one star to five stars, where one star corresponds with a poor software application and five stars correspond with an outstanding software application. The health check handlers 114, 122 may determine that a software application 120 is unhealthy 121U, if the number of one star ratings that a software application 120 receives exceeds a threshold (e.g., 1000). The health check handlers 114, 122 may use other methods for determining the health status 121 of the software application 120.

The agent 112 determines a local health status 121L of the software application 120. Although the agent 112 determines the local health status 121L of the software application 120, the local health status 121L may not be representative of the true health status 121 of the software application 120. Since the agent 112 resides inside the virtual machine 110, it is difficult for the agent 112 to determine the true health status 121 of the software application 120 (i.e., the health of the software application 120 as determined by the application server 130 from outside the virtual machine 110).

The health check handlers 114, 122 may determine the health status 121 of the software application 120 in accordance with health check configurations 174. In some implementations, user application files 172 that can reside in the user computer 170 specify the health check configurations 174. Additionally or alternatively, both the software developer 180d and the end user 180e may specify the health check configurations 174. In yet additional implementations, only the software developer 180d or only the end user 180e may specify the health check configurations 174. The health check configurations 174 can specify how and/or when the application server 130 and/or the virtual machine 110 determine the health status 121 of the software application 120. For example, the health check configurations 174 may specify that if a software application 120 does not respond to a request within five milliseconds, then the health status 121 of the software application 120 is unhealthy 121U.

In some examples, the health check configurations 174 specify that the health status 121 of the software application 120 is to be determined periodically, e.g., every five seconds. The health check configurations 174 may specify an amount of memory or the number of virtual machines 110 that the software application 120 is permitted to use, and if the software application 120 exceeds the usage limits then the health status 121 of the software application 120 is unhealthy 121U. Moreover, the health check configurations 174 may specify a list of resources that the software application 120 uses during execution. If, during execution, the software application 120 uses resources other than the user-specified resources, then the health status 121 of the software application 120 is unhealthy 121U. For example, the health check configurations 174 may specify the software application 120 is not permitted to use a camera API. If the software application 120 attempts to use the camera API, then the health check handlers 114, 122 determine that the software application 120 is unhealthy 121U.

In some scenarios, the software application 120 can become corrupt and can start behaving in an unpredictable manner. In such scenarios, the health check parameters 114 and/or 122 can determine that the software application 120 is unhealthy 121U. For example, the health check configurations 174 may specify the expected behavior of the software application 120. If the software application 120 deviates from the expected behavior specified in the health check configurations 174, then the health check handlers 114, 122 can determine that the software application 120 is unhealthy 121U. In the above example, the software developer 180d or the end user 180e may specify the expected behavior of the software application 120 in the health check configurations 174.

In some implementations, the application server 130 includes an administration console 132. The administration console 132 may provide a graphical user interface (GUI) to the user computer 170. The user 180 can use the GUI to provide the health check configurations 174 to the administration console 132. After the administration console 132 receives the health check configurations 174, the administration console 132 sends the health check configurations 174 to a data handler 134. The data handler 134 can convert the health check configurations 174 into a format that can be stored in a datastore 140. For example, the data handler 134 may validate input provided by the user 180 to make sure the input is valid. The data handler 134 may also verify whether the health check handlers 114, 122 are configured to determine the health status 121 of the software application 120 in accordance with the health check configurations 174 provided by the user 180. In some instances, the health check handlers 114, 122 may not be configured to determine the health status 121 of the software application 120 in accordance with the health check configurations 174 provided by the user 180. For example, the user 180 may have specified, in the health check configurations 174, for the health check handlers 114, 122 to determine the health status 121 every microsecond. But the health check handlers 114, 122 may be configured to determine the health status 121 at intervals of milliseconds. The data handler 134 may ignore the portion of the health check configurations 174 that directs the health check handlers 114, 122 to determine the health status 121 at every millisecond. Similarly, the data handler 134 may ignore other portions of the health check configurations 174 with which the health check handlers 114, 122 are not able to comply.

The administration console 132 sends the health check configurations 174 to an application master 138. While the application master 138 is shown separate from the application server 130, the application master 138 can be a part of the application server 130. The application master 138 manages all configuration data for the software application 120. The application master 138 receives the health check configurations 174 from the administration console 132 and stores the health check configuration 174 in the application configuration datastore 140b. Similar to the data handler 134, the application master 138 may validate the health check configuration 174 to make sure the health check configuration 174 is valid. The application master 138 may ignore certain health check configurations 174 that are infeasible (e.g., not possible to check). The application configuration datastore 140b stores the health check configurations 174 in a suitable format.

An application health monitor 136 determines a remote health status 121R of the software application 120 in accordance with the health check configurations 174. Unlike the agent 112, the application health monitor 136 is able to determine the health status 121 of the software application 120 from outside the virtual machine 110. Therefore, the remote health status 121R determined by the application health monitor 136 may be more accurate than the local health status 121L determined by the agent 112.

The application health monitor 136 determines the remote health status 121R of the software application 120 by interacting with the special health check handler 114, which in turn interacts with the application health check handler 122 inside the software application 120. After determining the remote health status 121R, the application health monitor 136 sends the remote health status 121R to the special health check handler 114. The special health check handler 114 saves the remote health status 121R for later use.

The agent 112 can receive the remote health status 121R determined by the application health monitor 136 from the special health check handler 114. In this manner, the agent 112 is aware of the local health status 121L and also the remote health status 121R. The agent 112 compares the local health status 121L with the remote health status 121R. If there is a mismatch between the local health status 121L and the remote health status 121R, then the agent 112 restarts the software application 120. If after restarting the software application 120 there is still a mismatch between a subsequent local health status 121L and a subsequent remote health status 121R, then the agent 112 restarts the virtual machine 110.

Unlike other virtual machines that may not be aware of the remote health status 121R, the virtual machine 110 and the agent 112 are aware of the remote health status 121R. In some scenarios, the remote health status 121R is unhealthy 121U, but the local health status 121L is healthy 121H. Other virtual machines that are not aware of an unhealthy remote health status 121R may continue to execute the software application 120 as long as the local health status 121L is healthy 121H. Unaware virtual machines are at a disadvantage, because the application server 130 may not direct network traffic to the unaware virtual machines. By contrast, the virtual machines 110 in the examples shown are aware of the remote health status 121R. In response to the remote health status 121R becoming unhealthy 121U, the virtual machines 110 may restart the software application 120 and/or the virtual machine 110 thereby restoring the flow of network traffic into the virtual machines 110.

Figure 3:
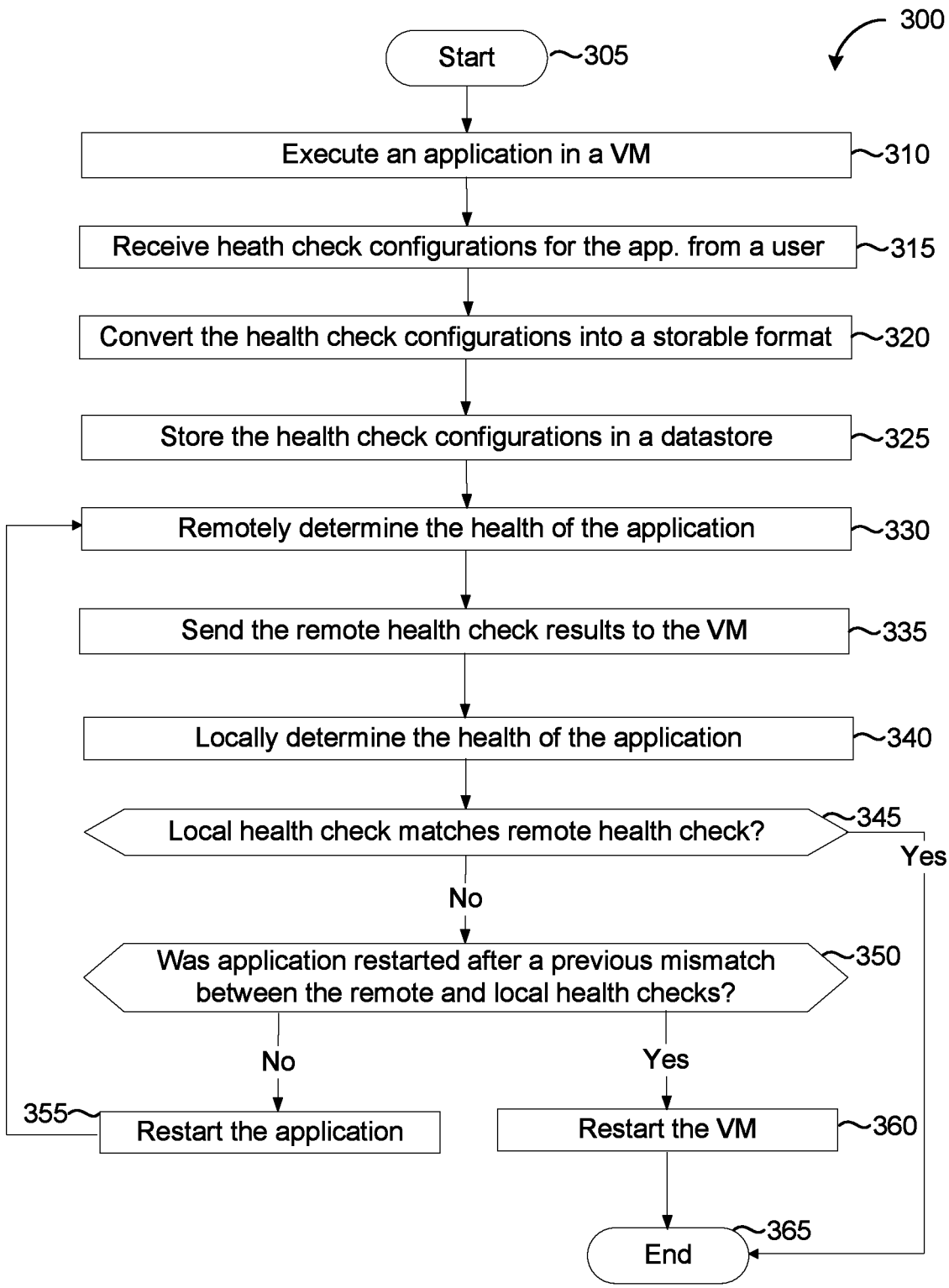
FIG. 3 is an example arrangement of operations for monitoring the health of a virtual machine.

FIG. 3 illustrates a method 300 for providing a software application 120 in a virtual machine 110. At 310, the virtual machine 110 executes a software application 120. At 315, the administrative console 132 receives health check configurations 174 for the software application 120 from the user 180. At 320, the data handler 134 and/or the application master 138 convert the health check configurations 174 into a storable format. As explained above, the data handler 134 may convert the health check configurations 174 into a format suitable for the health check configuration datastore 140a and the application master 138 may convert the health check configurations 174 into a format suitable for the application configuration datastore 140b. At 325, the method 300 includes storing the health check configurations 174 in a datastore 140.

At 330, the application health monitor 136 determines a remote health status 121R of the software application 120. As discussed above, the application health monitor 136 may determine the remote health status 121R of the software application 120 via the special health check handler 114. The special health check handler 114 in turn may determine the health status 121 of the software application 120 by interacting with the application health check handler 122 residing inside the software application 120.

At 335, the application health monitor 136 sends the remote health status 121R to the virtual machine 110. The application health monitor 136 may send the remote health status 121R to the special health check handler 114. Alternatively, the application health monitor 136 may send the remote health status 121R directly to the agent 112.

At 340, the virtual machine 110 determines a local health status 121L of the software application 120. In this implementation, the agent 112 determines the local health status 121L of the software application 120. The agent 112 may determine the local health status 121L of the software application 120 via the special health check handler 114. In some implementations, the agent 112 and/or the special health check handler 114 may determine the local health status 121L based on a previous remote health status 121R. For example, if the agent 112 and/or the special health check handler 114 determine that the last remote health status 121R is unhealthy 121U, then the agent 112 and/or the special health check handler 114 determine that the local health status 121L is unhealthy 121U. In some implementations, if the agent 112 and/or the special health check handler 114 determine that the last remote health status 121R is too old, then the agent 112 or the special health check handler 114 determine that the local health status 121L is unhealthy 121U. The last remote health status 121R may be too old if a difference between a current time and a time at which the agent 112 or the special health check handler 114 received the last remote health status 121R is greater than a threshold, for example one, two or five minutes.

At 345, the agent 112 compares the local health status 121L and the remote health status 121R. If the local health status 121L matches the remote health status 121R, then the method 300 ends at 365. If, however, the local health status 121L and the remote health status 121R do not match, then the method 300 proceeds to 350. As discussed above, in some cases, the local health status 12L may be healthy 121H but the remote health status 121R may be unhealthy 121U. This can happen because the agent 112 is inside the virtual machine 110 and it is difficult for the agent 112 to correctly determine the health status 121 of the software application 120.

If the local health status 121L and the remote health status 121R do not match, then the agent 112 first attempts to rectify the mismatch by restarting the software application 120, at 355. If after restarting the software application 120, subsequent determinations of the local health status 121L and the remote health status 121R match, then the agent 112 does not restart the virtual machine 110. If, however, after restarting the software application 120 subsequent determinations of the local health status 121L and the remote health status 121R still do not match, then the agent 112 restarts the virtual machine 110, at 360.

Figure 4:
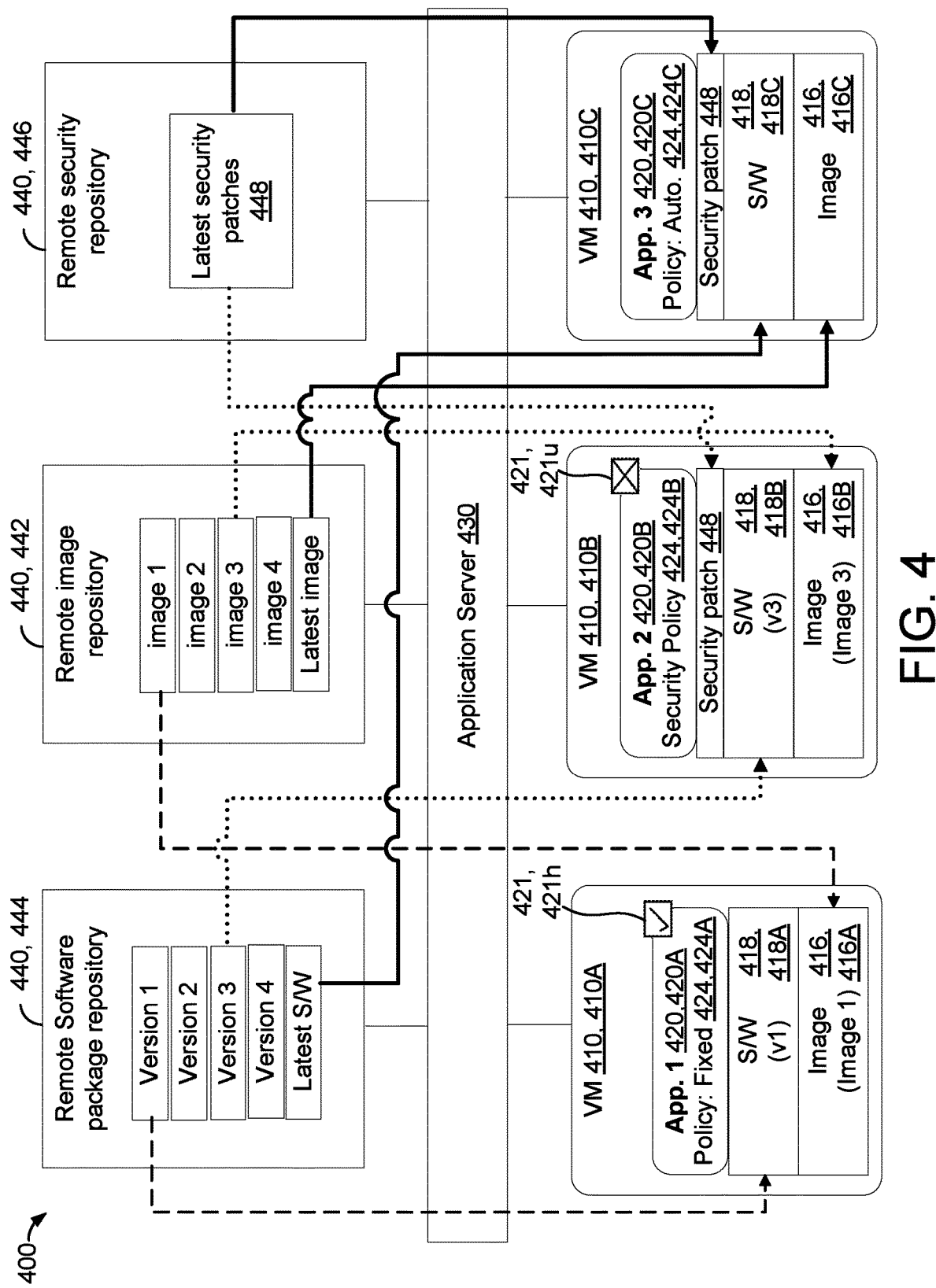
FIG. 4 is a block diagram of another example implementation of the distributed computing system.

FIG. 4 illustrates a distributed computing system 400. The distributed computing system 400 is similar to the distributed computing system 100 shown in FIG. 1. The distributed computing system 400 includes one or more virtual machines 410, an application server 430 and one or more repositories 440. As shown, the distributed computing system 400 includes three virtual machines 410, each executing a different software applications 420. Virtual machine 410a is executing software application 420a, virtual machine 410b is executing software application 420b and virtual machine 410c is executing software application 420c.

Each software application 420 has an associated policy 424. The policy 424 specifies how the virtual machine 410 is instantiated when a software application 420 is redeployed subsequent to an initial deployment of the software application 420. If a software application 420 is redeployed subsequent to the initial deployment of the software application 420, the policy 424 specifies which image 416 is mounted on the virtual machine 410 prior to the redeployment of the software application 420. The policy 424 may further specify which software package 418 is installed on the virtual machine 410 prior to the redeployment of the software application 420. The policy 424 may also specify whether a security patch 448 is installed on the virtual machine 410 prior to the redeployment of the software application 420. In the example of FIG. 4, there are three policies 424: a fixed policy 424a, a security policy 424b; and an automatic update policy 424c. In other examples, there may be more or less than three policies 424.

The fixed policy 424a specifies that when a software application 420a associated with the fixed policy 424a is redeployed subsequent to an initial deployment, the virtual machine 410a mounts the same image 416a that was mounted when the software application 420a was initially deployed. The fixed policy 424a further specifies that virtual machine 410a install the same software package 418a that was installed on the virtual machine 410a when the software application 420a was initially deployed. The fixed policy 424a further specifies that the virtual machine 410a not install the security patch 448 unless the security patch 448 was installed on the virtual machine 410a when the software application 420a was initially deployed. In some implementations, initial deployment of the software application 420 refers to a time when the software application 420 was deployed for the very first time in a production environment.

The security policy 424b specifies that when a software application 420b associated with the security policy 424b is redeployed subsequent to an initial deployment, the virtual machine 410b mount the same image 416b that was mounted when the software application 420b was initially deployed. The security policy 424b further specifies that virtual machine 410b install the same software package 418b that was installed on the virtual machine 410b when the software application 420b was initially deployed. The security policy 424b further specifies that the virtual machine 410b install the security patch 448. The security policy 424b differs from the fixed policy 424a in that the security policy 424b requires the virtual machine 410b to install the security patch 448, whereas the fixed policy 424a does not require the virtual machine 410 to install the security patch 448.

The automatic update policy 424c specifies that when a software application 420c associated with the automatic update policy 424c is redeployed subsequent to an initial deployment, the virtual machine 410c mount the latest image 416c that is stored in the remote image repository 442. The automatic update policy 424c further specifies that virtual machine 410c install the latest software package 418c that is stored in the remote software package repository 444. The automatic update policy 424c further specifies that the virtual machine 410c install the security patch 448. The automatic update policy 424c differs from the fixed policy 424a and the security policy 424b in that the automatic update policy 424c requires the virtual machine 410c to install the latest image 416c and the latest software package 418c instead of the image 416 and the software package 418 that were installed during the initial deployment of the software application 420.

Once a virtual machine 410 deploys a software application 420, there may be some circumstances in which the virtual machine 410 has to redeploy the software application 420. For example, the virtual machine 410 may need to restart the software application and/or the virtual machine 410 if the health status 421 of the software application 420 is unhealthy 421U, as discussed above. In some scenarios, the virtual machine 410 may have to redeploy the software application 420 by reinstalling the software application 420, the software package 418 and the image 416 in order to restore the health status 121 of the software application 420.

In some implementations, when the application server 430 and/or the virtual machine 410a redeploy the software application 420a that is associated with the fixed policy 424a, the application server 430 and/or the virtual machine 410a select the same image 416a and the same software package 418a that were used to initially deploy the software application 420a. Advantageously, by selecting the same image 418a and the same software package 418a that were used at the initial deployment, the application server 430 and/or the virtual machine 410a help ensure predictable behavior for the software application 420a upon redeployment. The application server 430 and the virtual machine 410a do not install the security patch 448 on the virtual machine 410a in order to ensure predictable execution of the software application 420a upon redeployment. However, if the security patch 448 was installed on the virtual machine 410a at the initial deployment of the software application 420a, then the application server 420 or the virtual machine 410a may install the security patch 448 on the virtual machine 410a.

In the example of FIG. 4, when the application server 430 and/or the virtual machine 410b redeploy the software application 420b that is associated with the security policy 424b, the application server 430 and/or the virtual machine 410b select the same image 416b and the same software package 418b that were used to initially deploy the software application 420b. Advantageously, by selecting the same image 418b and the same software package 418b that were used at the initial deployment, the application server 430 and/or the virtual machine 410b help ensure predictable behavior for the software application 420b upon redeployment. The application server 430 and the virtual machine 410a install the security patch 448 on the virtual machine 410b, because the software application 420b is associated with the security policy 424b that specifies that the security patch 448 be installed prior to redeployment. While installing the security patch 448 may change the behavior of the software application 420b upon redeployment, the change in behavior is minimized by maintaining the same image 416b and the same software package 418b.

With continued reference to FIG. 4, when the application server 430 and/or the virtual machine 410c redeploy the software application 420c that is associated with the automatic update policy 424c, the application server 430 and/or the virtual machine 410c select the latest image 416c and the latest software package 418c. The application server 430 and/or the virtual machine 410c install the security patch 448 on the virtual machine 410b, because the software application 420b is associated with the automatic update policy 424c that specifies that the security patch 448 be installed prior to redeployment. Unlike the software application 420a, the behavior of the software application 420c may change upon redeployment.

Figure 5:
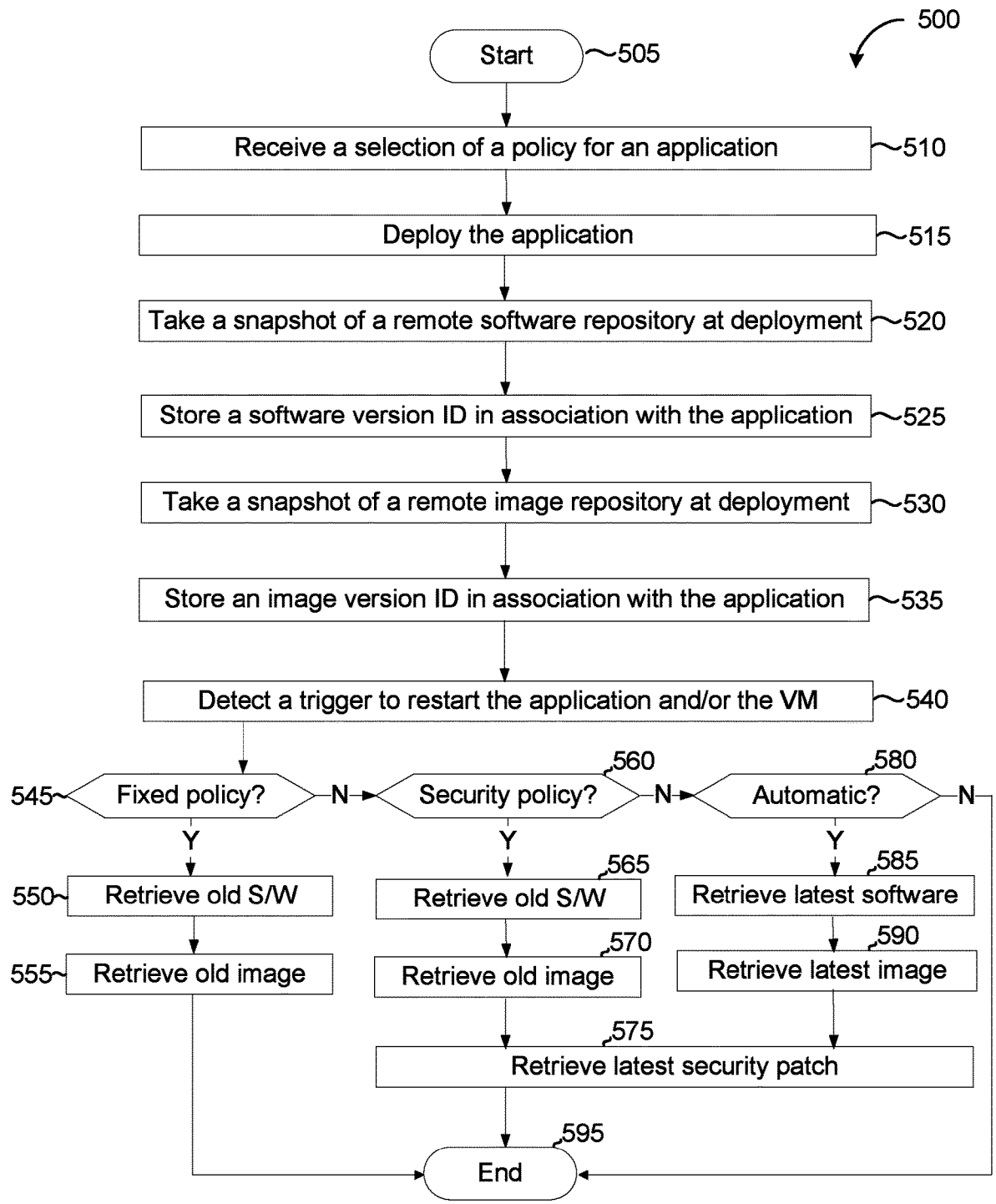
FIG. 5 is an example arrangement of operations for redeploying a software application on a virtual machine.

FIG. 5 illustrates a method 500 for redeploying a software application 420 on a virtual machine 410. At 510, the application server 430 receives a selection of the policy 424 for the software application 420. The application server 430 may display the three policies 424a, 424b and 424c to a user via a graphical user interface and the user may select one of the policies as the policy the user intends to impose on the software application 420.

At 515, the application server 430 initially deploys the software application 420. At 520, the application server 430 takes a snapshot of the remote software repository 444 when the software application 420 is initially deployed. The application server 430 may take the snapshot of the remote software repository 444 by archiving the software package 418 that was initially installed on the virtual machine 410. By taking a snapshot of the remote software repository 444, the application server 430 ensures that the software package 418 installed on the virtual machine 410 at initial deployment may be available for use during a redeployment at a later time. At 525, the application server 430 stores a version identifier (ID) of the software package 418 in association with the software application 420. When the application server 430 and/or the virtual machine 410 redeploy the software application 420 at a later time, the application server 430 can use the version ID to retrieve the software package 418 that was initially installed on the virtual machine 410.

At 530, the application server 430 takes a snapshot of the remote image repository 442 when the software application 420 is initially deployed. The application server 430 may take the snapshot of the remote image repository 442 by archiving the image 416 that was initially mounted on the virtual machine 410. By taking a snapshot of the remote image repository 442, the application server 430 ensures that the image 416 mounted on the virtual machine 410 at initial deployment may be available for use during a redeployment at a later time. At 535, the application server 430 stores the version ID of the image 416 in association with the software application 420. When the application server 430 and/or the virtual machine 410 redeploy the software application 420 at a later time, the application server 430 can use the version ID to retrieve the image 416 that was initially mounted on the virtual machine 410.

At 540, the application server 430 and/or the virtual machine 410 detect a trigger to restart the software application 420 and/or the virtual machine 410. For example, the agent 112 may have determined a mismatch between the local health status 121L and the remote health status 121R, and the agent 112 may decide to restart the software application 420 or to the restart the virtual machine 410, as discussed above. Upon a trigger to redeploy the software application 420, the application server 430 and/or the virtual machine 410 determine which policy 424 is associated with the software application 420.

At 545, the application server 430 determines whether the fixed policy 424a is associated with the software application 420. If the fixed policy 424a is associated with the software application 420, then the application server 430 retrieves the software package 418a from the remote software repository 444 using the software version ID stored in association with the software application 420a, at 550. At 555, the application server 430 retrieves the image 416a from the image repository 442 using the image version ID stored in association with the software application 420a. Upon retrieving the image 416a and the software package 418a, the application server 430 and/or the virtual machine 410a mount the image 416a onto the virtual machine 410a, install the software package 418a on the virtual machine 410a and redeploy the software application 420a. In this scenario, due to the fixed policy 424a, when the application server 430 and/or the virtual machine 410a redeploy the software application 420a, the software application 420a executes on the same image 416a and the same software package 418a as the software application 420a was executing on when the application server 430 and/or the virtual machine 410a initially deployed the software application 420a. As a result, the software application 420a is more likely to behave in a predictable manner.

If the policy 424 associated with the software application 420 is not the fixed policy 424a, then the application server 430 determines whether the policy 424 associated with the software application 420 is the security policy 424b, at 560. If the policy 424 is the security policy 424b, then at 565 the application server 430 retrieves the software package 418b from the remote software repository 444 using the software version ID stored in association with the software application 420b. At 570, the application server 430 retrieves the image 416b from the image repository 442 using the image version ID stored in association with the software application 420b. At 575, the application server 430 retrieves the latest security patch 448 from the security repository 446. The security patch 448 is installed on the virtual machine 410b.

If at 560, the application server 430 determines that the security policy 424b does not apply, then at 580, the application server 430 determines whether the automatic update policy 424c applies. If the automatic update policy 424c applies, then at 585, the application server 430 retrieves the latest software package 418c from the remote software repository 444, at 585. At 590, the application server 430 retrieves the latest image 416c from the remote image repository 442. At 575, the application server retrieves the security patch 448 and installs the security patch 448 on the virtual machine 410c.

Figure 6:
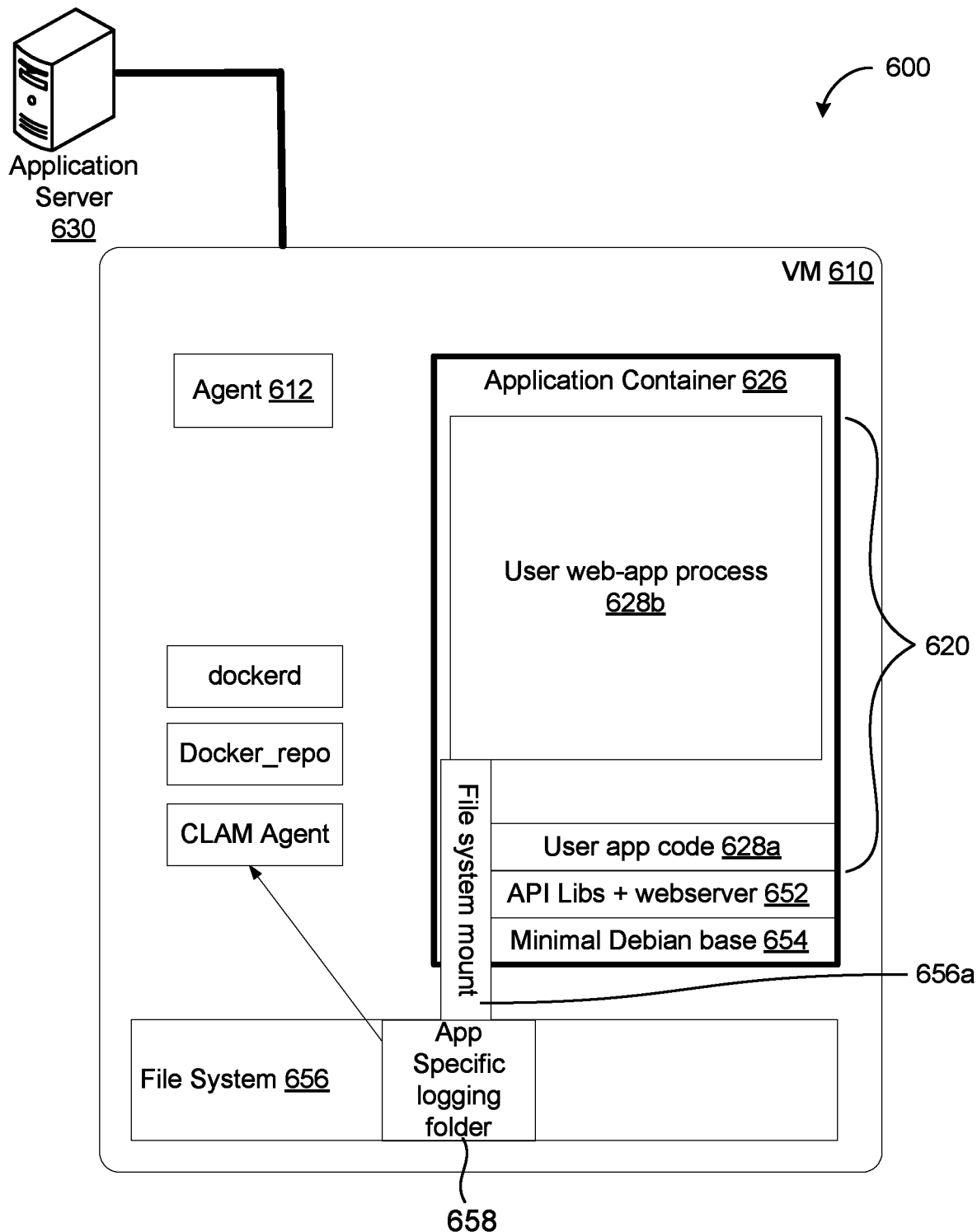
FIG. 6 is a block diagram of an example virtual machine interfaced with an application server.

FIG. 6 illustrates an example implementation of a distributed computing system 600. The distributed computing system 600 includes a virtual machine 610 interfacing with an application server 630. The virtual machine 610 includes an application container 626 (e.g., a Linux container). Alternatively, the application container 626 may be a docker container. The application container 626 includes all the software code of the software application 620. The application container 626 includes the application code 628a and the user web-app process 628b. The code 628a makes references to resources, such as application programming interface libraries and certain operating system resources. The application container 626 contains the application programming interface libraries 652 that the code 628a references. The application container 626 also contains portions of the operating system 654 that the code 628a references. The application container 626 may contain other resources that are normally found in a virtual machine 610 and that the code 628a references. The virtual machine 610 includes an image of the operating system. The operating system includes a file system 656. The file system 656 is located outside the application container 626.

The application container 626 includes a file system mount 656a on an application specific logging folder 658 of the file system 656. The code 628a can interact with the file system 656 of the operating system via the file system mount 656a. The application container 626 may only contain those portions of the file system 656 that are necessary for the code 628a to function as intended. By excluding all other portions of the file system 656 and the operating system from the application container 626, the virtual machine 610 is relatively safer from unforeseen bugs in the code 628a. For example, the code 628a may have certain malicious functions that attempt to derail the stability of the virtual machine 610. Any malicious functions in the code 628a can only access the resources provided in the application container 626 and not the resources located outside the application container 626. For example, the code 628a cannot access the entire file system 656, therefore the amount of damage that the code 628a can do to the file system 656 and other portions of the operating system is limited.

The agent 612 can monitor the resources that the code 628a and the web process 628b attempt to access. If the software application 620 attempts to access APIs or other resources that are outside the application container 626, then the agent 612 can halt execution of the software application 620. Alternatively, the agent 612 can terminate the execution of the software application 620. Further, the agent 612 can detect breaches in the boundary of the application container 626. For example, if the code 628a is successful in accessing a restricted or an unauthorized resource of the file system 656 that is outside the application container 626, then the agent 612 can halt operation of the virtual machine 610 or terminate the virtual machine 610 altogether, thereby preventing excessive damage to the virtual machine 610.

The agent 612 may be configured to detect attempts from the code 628a to access resources outside the application container 626 and generate a warning that may be provided to the application server 630. The application server 630 may provide the warning to a user 180. The user 180 may override the boundaries of the application container 626, thereby allowing the software application 620 to access portions of the file system 656 that are located outside the container 626.

Figure 7:
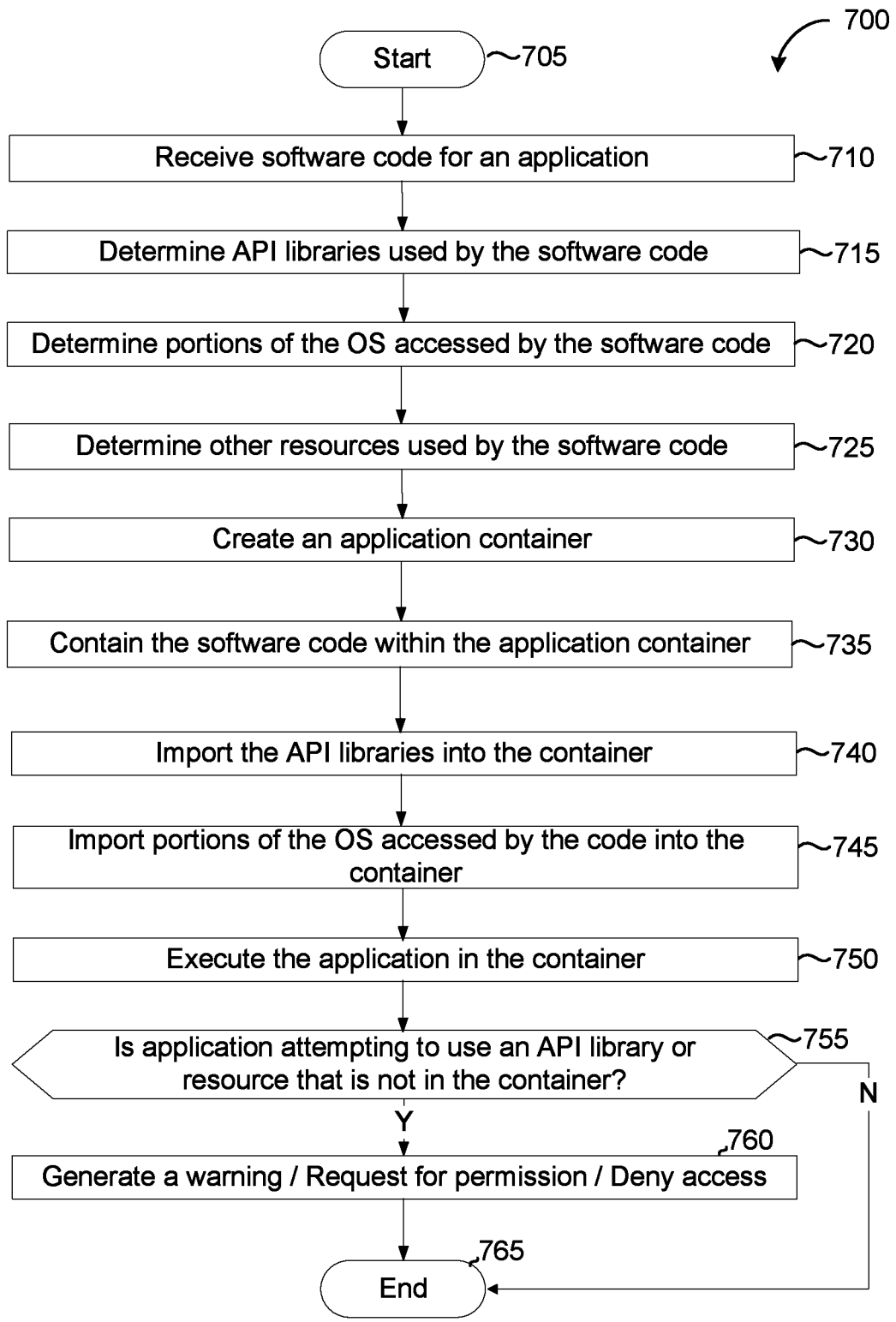
FIG. 7 is an example arrangement of operations for executing a software application on a virtual machine.

FIG. 7 depicts a method 700 for executing a software application 620 in a virtual machine 610. At 710, the software application 630 receives the code 628a for the software application 620. At 715, the application server 630 determines the API libraries used by the software code 628a. The application server 630 may determine the API libraries used by the software code 628a by determining the libraries referenced by the software code 628a. At 720, the application server 630 determines portions of the operating system that are accessed by software code 628a. At 725, the application server 630 determines any other resources used by the software code 628a.

At 730, the application server 630 instructs the virtual machine 610 to create an application container 626. The virtual machine 610 contains the software code 628a of the software application 620 inside the application container 626, at 735. At 740, the virtual machine 610 imports the API libraries referenced by the software application 620 into the application container 626. The virtual machine 610 imports portions of the operating system accessed by the software code 628a into the application container 626, at 745.

At 750, the virtual machine 610 executes the software application 620 inside the application container 626. At 755, the agent 612 determines whether the software application 620 is attempting to use an API library or resource that is outside the application container 626. At 760, the agent 612 generates a warning that the software application 620 is attempting to access an API or other resource that is outside the application container 626. The warning may be sent to the application server 630. The application server 630 may send the warning to the user 180 that the software application 620 is trying to access a resource outside the application container 626.

Alternatively, at 760, the agent 612 can request the application server 630 for permission to expand the boundaries of the application container 626. If the application server 630 grants permission to expand the boundaries of the application container 626, the virtual machine 610 modifies the boundaries of the application container 626 by including additional resources inside the application container 626 that the software application 620 requests during execution. In another example implementation, the agent 612 halts execution of the software application 620 when the software application 620 attempts to access an API or other resource that is outside the application container 626. The method 700 ends at 765.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims.

What is claimed is:

1. A method comprising:
   executing a virtual machine executing on a data processing device, the virtual machine comprising:
   an application container comprising:
   a file system mount interfaced with a file system residing outside the application container;
   an application programming interface (API); and
   a software application including a reference to the API; and
   an agent configured to monitor whether the software application attempts to access any resources outside of the application container, wherein when the software application attempts to access any resources outside of the application container, the agent configured to execute a remediation routine.

2. The method of claim 1, wherein the remediation routine comprises sending a warning to an application server or a user.

3. The method of claim 1, wherein the remediation routine comprises halting operation of or terminating the virtual machine.

4. The method of claim 1, wherein the remediation routine comprises halting operation of or terminating the software application.

5. The method of claim 1, wherein the application container does not include application programming references that are not referenced by the software application.

6. The method of claim 1, wherein the agent is further configured to:
   determine at least one other API referenced by the software application and whether the at least one other API resides outside the application container;
   determine whether the software application attempts to access the at least one other API; and
   when the software application attempts to access the at least one other API, executing the remediation routine.

7. The method of claim 1, wherein the application container is configured to prevent the software application from accessing the resources outside of the application container.

8. A method comprising:
   executing a virtual machine on a data processing device;
   receiving, at the data processing device, a software application;
   instantiating an application container on the virtual machine, the application container including:
   the software application;
   any application programming interfaces (APIs) referenced by the software application; and
   a file system mount interfacing with a file system residing outside the application container;
   monitoring, by the data processing device, whether the software application attempts to access any resources outside of the application container; and
   when the software application attempts to access any resources outside of the application container, executing, by the data processing device, a remediation routine.

9. The method of claim 8, wherein the remediation routine comprises sending a warning to an application server or a user.

10. The method of claim 8, wherein the remediation routine comprises halting operation of or terminating the virtual machine.

11. The method of claim 8, wherein the remediation routine comprises halting operation of or terminating the software application.

12. The method of claim 8, wherein the application container does not include application programming references that are not referenced by the software application.

13. The method of claim 8, further comprising:
   determining at least one other API referenced by the software application and whether the at least one other API resides outside the application container;
   determining whether the software application attempts to access the at least one other API; and
   when the software application attempts to access the at least one other API, executing the remediation routine.

14. The method of claim 8, wherein the application container is configured to prevent the software application from accessing the resources outside of the application container.

15. A system comprising:
   a data processing device; and
   memory in communication with the data processing apparatus, the memory storing instructions that when executed on the data processing device cause the data processing device to perform operations comprising:
   executing a virtual machine;
   receiving a software application;
   instantiating an application container on the virtual machine, the application container including:
      the software application;
      any application programming interfaces (APIs) referenced by the software application; and
      a file system mount interfacing with a file system residing outside the application container;
   monitoring whether the software application attempts to access any resources outside of the application container; and
   when the software application attempts to access any resources outside of the application container, executing a remediation routine.

16. The system of claim 15, wherein the remediation routine comprises sending a warning to an application server or a user.

17. The system of claim 15, wherein the remediation routine comprises halting operation of or terminating the virtual machine.

18. The system of claim 15, wherein the remediation routine comprises halting operation of or terminating the software application.

19. The system of claim 15, wherein the application container does not include application programming references that are not referenced by the software application.

20. The system of claim 15, further comprising:
   determining at least one other API referenced by the software application and whether the at least one other API resides outside the application container;
   determining whether the software application attempts to access the at least one other API; and
   when the software application attempts to access the at least one other API, executing the remediation routine.

21. The system of claim 15, wherein the application container is configured to prevent the software application from accessing the resources outside of the application container.

* * * * *